UNITED STATES PATENT OFFICE.

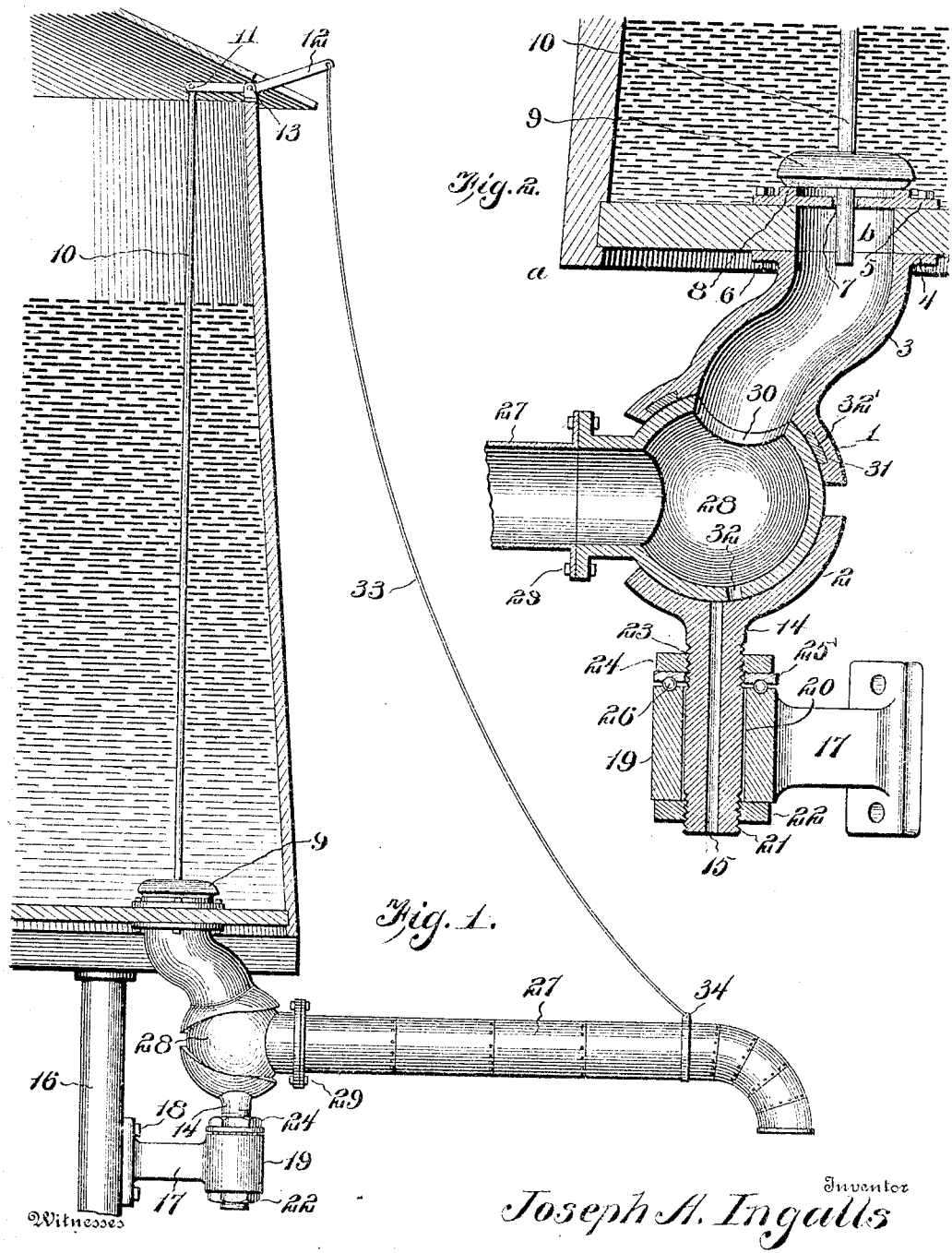

JOSEPH A. INGALLS, OF POCATELLO, IDAHO, ASSIGNOR OF ONE-THIRD TO GEORGE H. OLMSTEAD AND ONE-THIRD TO JAMES A. WEED, OF POCATELLO, IDAHO.

TANK VALVE AND SPOUT.

No. 888,331.     Specification of Letters Patent.     Patented May 19, 1908.

Application filed July 13, 1907. Serial No. 383,587.

*To all whom it may concern:*

Be it known that I, JOSEPH A. INGALLS, citizen of the United States, residing at Pocatello, in the county of Bannock and State of Idaho, have invented new and useful Improvements in Tank Valves and Spouts, of which the following is a specification.

This invention is an improved spout and valve, for use in connection with a railroad water tank for supplying water to locomotive tenders and also adapted for use in connection with a stand pipe, and for other purposes, and the said invention consists in the combination with a discharge duct providing a pair of socket members and having a valve, a spout having a hollow ball member at its inner end seated in said socket members and provided with an opening to communicate with such duct when the said spout is in a lowered position, as hereinafter more fully described and claimed.

In the accompanying drawings:—Figure 1 is a sectional view of a portion of a railroad tank provided with a discharge spout valve embodying my invention. Fig. 2 is a vertical sectional view, on a larger scale, showing a portion of the tank and also showing a valve, the duct providing the socket members, and an inner portion of the spout with the ball member seated in such socket members.

In accordance with this invention, I provide a pair of socket members 1—2 each of which constitutes a segment of a sphere, said socket members being disposed one above the other and suitably spaced apart. The upper socket member 1 is formed at the lower end of a discharge tube or duct 3 which has at its upper end an annular circumferential flange 4 to bear against the bottom of a tank, such as indicated at *a*, to cause the upper end of the duct or discharge tube to register with the discharge opening *b* in the tank bottom. Over such opening and on the upper side of the tank bottom is a circular plate 5 secured to the tank bottom and to the flange 4 by means of bolts 6. Such plate has a center opening 7 and has on its upper side an upstanding annular flange 8 which is concentric with such opening and provides a seat for a valve 9. A rod 10 is attached to such valve and extends through a central opening therein. The lower end of such rod, which projects below the valve, extends through and is smaller than the opening 7. Such rod is disposed and extends upwardly in a tank and its upper end is connected, as at 11, to a lever 12 which is pivotally mounted as at 13 on the upper side of the tank.

The lower socket member 2 is provided with a depending stem 14 which has a vertical longitudinal bore 15 extending therethrough. An arm or other suitable supporting member 16 extends downwardly from the bottom of the tank. A bracket 17 is secured to such arm or supporting member as by means of bolts 18 and is provided at its outer end with a vertically disposed cylindrical head 19 which has a vertical bore 20 extending therethrough, to receive the tubular stem 14 of the lower socket member 2. Said stem 14 has its lower portion screw-threaded as at 21 and provided with a nut 22 to bear against the lower end of the hub 19 and has its upper portion screw-threaded as at 23 to receive a nut 24. A disk 25 has a central opening through which the stem 14 extends, is disposed under the nut 24 and an annular ball race is formed in the opposing sides of the bracket head 19 and the disk 25 for the reception of bearing balls 26, which serve to provide an anti-friction bearing between the socket member 2 and its supporting bracket 17, as will be understood. The ends 22—23 in coaction with the screw-threaded portions of the stem 24 enable the lower socket member to be adjusted vertically and be set at any desired adjustment to compensate for wear between the ball member and the socket members and prevent leakage around the ball member.

The spout 27, which may be raised and lowered to some extent and may also be turned or swung in a horizontal plane, is provided at its inner end with a hollow ball member 28 bolted thereto as at 29 and seated in and between the socket members 1—2 and provided in its upper side with an opening 30, which communicates with the bore of the tube or duct 3. The upper socket member 1 is provided in its inner face with an annular groove 31 to receive a suitable packing 32, which bears on said ball member. In the lower side of the latter, is an opening 32 to register with the bore 15 of the lower socket member stem 14 to permit the escape of such water as may be in the inner portion of the spout, such ball member, and the tube or duct 3, after the valve 9 has been closed and the use of the spout discontinued.

It will be understood that the ball member of the spout and the sockets of the spout supporting devices effect a ball and socket connection between such supporting devices and such spout and enable the spout to be swung laterally so that it may be extended outwardly from the tank and readily disposed in position to discharge water from the tank into a locomotive tender and when not in use such spout may be swung inwardly under the bottom of the tank and out of the way. An operating cord for the valve 9, is shown at 33 connected to the outer end of the valve operating lever 12 and to the spout near its outer end as at 34.

Having thus described the invention, what is claimed, is:—

1. The combination of a tank having a discharge opening, a duct having means at its upper end to attach said duct to the tank at a point coincident with the discharge opening, said duct having an upper socket member at its lower end forming a segment of a sphere; a supporting device below the tank, a bracket attached to such supporting device and having a bearing opening, a lower socket member forming a segment of a sphere and having a depending stem extending through the bearing opening in the bracket, said stem provided with supporting means coacting with said bracket and further provided with a bore extending from end to end thereof and open at its ends, and a spout provided at its inner end with a hollow ball member located between and engaged by said socket members, said ball member having an opening to register with the duct of the upper socket member, and provided at its lower side with an opening to register with the bore of the stem of the lower ball member, the last mentioned opening being adapted to be placed into or out of register with said bore.

2. In an apparatus of the class described, the combination of a supporting bracket having a head, a lower socket member having a stem depending therefrom and pivotally mounted in said bracket head, said stem constituting a drainage duct, an upper socket member providing also a duct and a spout having a hollow ball member at its inner end seated in and between such socket members having an opening to communicate with the duct of the upper socket member and also having a drainage opening in its lower side to be moved into and out of registration with a drainage duct formed by the stem of the lower socket member.

In testimony whereof, I affix my signature in presence of two witnesses.

JOSEPH A. INGALLS.

Witnesses:
   J. M. MASONHEIMER,
   J. P. WIRTZ.